(12) United States Patent
Sawa

(10) Patent No.: US 7,396,616 B2
(45) Date of Patent: Jul. 8, 2008

(54) SOLID ELECTROLYTE AND ELECTROCHEMICAL SYSTEM USING THE SOLID ELECTROLYTE

(75) Inventor: Haruo Sawa, Kochi-ken (JP)

(73) Assignee: Nippon Kodoshi Corporation, Kochi-ken (JP)

( * ) Notice: Subject to any disclaimer, the term of this patent is extended or adjusted under 35 U.S.C. 154(b) by 700 days.

(21) Appl. No.: 10/765,862

(22) Filed: Jan. 29, 2004

(65) Prior Publication Data

US 2004/0188248 A1 Sep. 30, 2004

(30) Foreign Application Priority Data

Mar. 26, 2003 (JP) ............... 2003-086422

(51) Int. Cl.
*H01M 8/10* (2006.01)
*H01M 10/08* (2006.01)

(52) U.S. Cl. .................. 429/313; 429/33; 252/62.2

(58) Field of Classification Search ............... 429/12, 429/33, 313; 252/62.2
See application file for complete search history.

(56) References Cited

U.S. PATENT DOCUMENTS

| | | | |
|---|---|---|---|
| 4,448,493 A * | 5/1984 | Matsudaira et al. ......... | 359/268 |
| 5,409,785 A * | 4/1995 | Nakano et al. ............... | 429/33 |
| 6,838,210 B2 | 1/2005 | Sawa | |
| 7,101,638 B2 | 9/2006 | Sawa | |
| 7,238,445 B2 | 7/2007 | Sawa | |
| 2004/0081892 A1 | 4/2004 | Sawa | |

FOREIGN PATENT DOCUMENTS

| | | | |
|---|---|---|---|
| JP | 05152166 | * | 1/1993 |
| JP | 5152166 | | 6/1993 |
| JP | 2003007133 | * | 1/2003 |

OTHER PUBLICATIONS

Yamada et al., "Oxygen-utilization Performance of Trickle-bed Cathode for On-site Electrochemical Production of Hydrogen Peroxide", Electrochemistry 69 No. 3 (2001), pp. 154-159.
Notten et al., "Optical Switching of Y-Hydride Thin Film Electrodes", J. Electrochem. Soc., vol. 143, No. 10, Oct. 1996, The Elcetrochemical Society, Inc., pp. 3348-3353.
Notsu et al., "Test of Novel Air Conditioner by Solid-Polymer Dehumidifying Cell", 2000 IEE Japan, pp. 3373-3374.

* cited by examiner

*Primary Examiner*—Mark Ruthkosky
(74) *Attorney, Agent, or Firm*—Shlesinger, Arkwright & Garvey LLP

(57) ABSTRACT

It is an object to provide a solid electrolyte and an electrochemical system using the solid electrolyte which has a little expansion (swelling) and whose strength does not decrease in case of positioning the solid electrolyte including a complex compound composed of an inorganic compound, polyvinyl alcohol, and water, in a wet condition. It is possible to use the solid electrolyte in a device such as a fuel cell or an electrolytic device used with the wet condition. The solid electrolyte has a little size variation even if humidity varies and has a low methanol permeability. The solid electrolyte is produced by replacing a part or all of hydroxyl groups of polyvinyl alcohol domain to groups each of which has a water absorption less than that of said hydroxyl group, in the solid electrolyte including a complex compound which is composed of polyvinyl alcohol, water, and at least one inorganic compound selected from silicic acid compound, tungstic acid compound, molybdic acid compound, stannic acid compound, and zirconic acid compound.

9 Claims, 2 Drawing Sheets

(a) acetalizing reaction, (b) etherifying reaction, and (c) esterifying reaction for hydroxyl group of polyvinyl alcohol domain in complex compound included in solid electrolyte.

(a) acetalizing reaction, (b) etherifying reaction, and (c) esterifying reaction for hydroxyl group of polyvinyl alcohol domain in complex compound included in solid electrolyte.

SOLID ELECTROLYTE AND ELECTROCHEMICAL SYSTEM USING THE SOLID ELECTROLYTE

BACKGROUND OF THE INVENTION

The present invention relates to a proton conductive solid electrolyte with high ion conductivity or a hydroxide ion conductive solid electrolyte with high ion conductivity that is applicable to a fuel cell or the like, and an electrochemical system using the solid electrolyte with high ion conductivity.

Conventionally, electrochemical systems, such as a fuel cell, a dehumidifier, or an electrolytic hydrogen producing device are commercialized as an electrochemical system using a proton conductive solid electrolyte. More specifically, a proton conductive solid electrolyte film, which operates at a low temperature, covers a broad range in application. For example, in a solid polymer fuel cell, current flows and electric energy is obtained in accordance with an electrochemical oxidative reaction of hydrogen supplied to a negative electrode that is indicated by the following formula (1), an electrochemical reduction of oxygen supplied to a positive electrode that is indicated by a formula (2), and a reaction based on proton motion in the electrolyte between the positive electrode and the negative electrode.

$$H_2 \rightarrow 2H^+ + 2e^- \quad (1)$$

$$1/2O_2 + 2H^+ + 2e^- \rightarrow H_2O \quad (2)$$

It is known a fuel cell of direct methanol type in which a methanol is supplied as a fuel to the negative electrode of the fuel cell. Furthermore, it is known a fuel cell using another fuel instead of hydrogen or the methanol. Also in these cases, the reaction is carried out in which the fuel is electrochemically oxidized at the negative electrode to release proton, in a similar manner. Therefore, it is possible to operate by using the proton conductive solid electrolyte.

For example of the electrolytic device, the electrolytic hydrogen producing device is commercialized. The electrolytic hydrogen producing device produces hydrogen on the basis of a reaction inverse to the reaction described in conjunction with the formulas (1) and (2) in the fuel cell. Inasmuch as it is possible to obtain high purity hydrogen in on-site by using only water and electric power in the electrolytic hydrogen producing device, it is unnecessary to have a hydrogen gas cylinder. In addition, it is possible to easily carry out electrolysis by introduction of pure water having no electrolyte solute, owing to employ the solid electrolyte. Using a similar system, an attempt is made to manufacture hydrogen peroxide for bleach by the electrolytic method using the following formula (3), in paper industry (referring to a non-patent publication 1).

$$O_2 + H_2O + 2e^- \rightarrow HO_2^- + OH^- \quad (3)$$

The dehumidifier has a structure in which the proton conductive solid electrolyte is sandwiched between the positive electrode and the negative electrode, in a manner similar to the fuel cell or the hydrogen producing device. When a voltage is applied between the positive electrode and the negative electrode, water is split into proton and oxygen at the positive electrode on the basis of the reaction indicated by the following formula (4). The proton moves through the solid electrolyte to the negative electrode to be subjected to a reaction indicated by a formula (5). As a result, the union of the proton and the oxygen in air forms water. As a result of these reactions, water moves from the positive electrode to the negative electrode so that dehumidification is carried out in the positive electrode.

$$H_2O \rightarrow 1/2O_2 + 2H^+ + 2e^- \quad (4)$$

$$1/2O_2 + 2H^+ + 2e^- \rightarrow H_2O \quad (5)$$

It is also possible to split water and to eliminate moisture by using the principle of operation that is similar to the electrolytic hydrogen producing device. Proposal is made as regards an air conditioner in which the electrolytic hydrogen producing device is combined with a moisture evaporating cold blast device (referring to non-patent publication 2).

In any one of the above-mentioned systems, perfluoro sulfonic acid type ion exchange membrane represented by Nafion is used as the solid electrolyte. In addition, a sort of sensors, electrochromic device or the like is essentially a system based on a principal of operation similar to the above-mentioned. Inasmuch as the system is driven when the proton moves in the electrolyte between a pair of positive and negative electrodes which carry out reduction and oxidation, respectively, it is possible to use the proton conductive solid electrolyte. At present, experimental study is carried out with respect to the system using these proton conductive solid electrolytes.

For a hydrogen sensor, variation of electrode potential based on the concentration of hydrogen when hydrogen is introduced into the hydrogen sensor in the reaction indicated by the above-mentioned formulas (4) and (5) may be used. Furthermore, it is also possible to be applied to a humidity sensor, by using the variation of electrode potential or ion conductivity.

When an electric field is applied to the negative electrode of the electrochromic device using $WO_3$ or the like, the electrochromic device makes a color on the basis of reaction indicated by the following formula (6) and can be used as a displaying device or a light proof glass. This system operates when protons are given to the negative electrode. It is possible to use the proton conductive solid electrolyte in this system.

$$WO_3 + xH^+ + xe^- \rightarrow H_xWO_3 \text{ (coloring)} \quad (6)$$

In addition, there are a primary battery, a secondary battery, an optical switch, and an electrolyzed water producing apparatus, as the electrochemical system which operates by using the proton conductive solid electrolyte in principal. For example, a hydrogen absorbing alloy is used as the negative electrode, a nickel hydroxide is used as the positive electrode, and an alkali electrolytic solution is used as the electrolytic solution in a nickel hydride battery of the secondary battery. As indicated by formulas (7) and (8), the electrochemical reduction and oxidation with respect to the proton and hydrogen absorption in the hydrogen absorbing alloy occur in the negative electrode on charge and discharge.

$$\text{(charge) } H_2O + e^- \rightarrow H\text{(absorbing)} + OH^- \quad (7)$$

$$\text{(discharge) } H\text{(absorbing)} + OH^- \rightarrow H_2O + e^- \quad (8)$$

As indicated by formulas (9) and (10), the electrochemical oxidation and reduction occur with respect to the nickel hydroxide in the positive electrode.

$$\text{(charge) } Ni(OH)_2 + OH^- \rightarrow NiOOH + H_2O + e^- \quad (9)$$

$$\text{(discharge) } NiOOH + H_2O + e^- \rightarrow Ni(OH)_2 + OH^- \quad (10)$$

The charge and discharge reaction occurs in the battery by the transfer of the proton or the hydroxyl ion in the electrolyte. Although it is possible to use the proton conductive solid electrolyte in principal, the alkali electrolytic solution is used in the prior art.

Proposal is made in the optical switch about using yttrium as the negative electrode (referring to non-patent publication 3). When supplied with the electric field, yttrium is hydrogenated as indicated by formula (11) to allow the light to pass therethrough. As a result, it is possible to switch between the light transmission and the non-light transmission by electric field. Although it is possible to use the proton conductive solid electrolyte in principal in this system, the alkali electrolytic solution is used in the prior art.

$$Y + 3/2H_2O + 3e^- \rightarrow YH_3 + 3OH^- \qquad (11)$$

The electrolyzed water is water which is produced by the electrolyzing reaction. Although availability is different between the reduction side and the oxidation side, the electrolyzed water has availability in a healthy effect, a bactericidal action, a detergent action, and a growth of farm products. It is possible to use the electrolyzed water in drinking water, food service water, detergent water, agricultural water or the like. The electrolyzing reaction is promoted when the water has the electrolyte. When the electrolyte solute is dissolved in water, it often necessary to remove the electrolyte solute from the water on using the water. When the solid electrolyte is used as the electrolyte, it is unnecessary to remove the electrolyte solute from the water.

The conventional proton conductive solid electrolyte for the low temperature operation, which is used in each of the above-mentioned electrochemical systems, is almost a polymeric ion exchange membrane of perfluoro sulfonic acid type that is represented by Nafion film. However, there is a problem in which the perfluoro sulfonic acid type electrolyte is expensive on the basis of complexity of manufacturing process. By the economies of mass production, it is expected that a low-priced electrolyte is manufactured. However, there is limitation of the low-price. It is desired that a cheap alternate member appears presently. In addition, an amount of methanol used as the fuel permeates through perfluoro sulfonic acid type electrolyte, in the direct methanol type fuel cell. As a result, there is a problem in which energy conversion efficiency greatly reduces.

By the way, proposal is made as regards a complex compound having polyvinyl alcohol and various inorganic compounds, as cheep high ion conductive electrolytic material instead of the perfluoro sulfonic acid type electrolyte. For example, the complex compound is proposed which is obtained by mainly chemically bonding polyvinyl alcohol to silicic acid compound in a micro-level (referring to patent publication 1). In addition, the complex compound is proposed which is obtained by mainly chemically bonding polyvinyl alcohol to tungstic acid compound in a micro-level (referring to patent publication 2). The complex compound is further proposed which is obtained by mainly chemically bonding polyvinyl alcohol to molybdic acid compound in a micro-level (referring to patent publication 2). The complex compound is further proposed which is obtained by mainly chemically bonding polyvinyl alcohol to stannic acid compound in a micro-level (referring to patent publication 3). The complex compound is further proposed which is obtained by mainly chemically bonding polyvinyl alcohol to zirconic acid compound in a micro-level (referring to patent publication 4 or 5). The complex compound includes at least one selected from phosphorus, boron, aluminum, titanium, calcium, strontium, and barium compound, as other components. It is possible to produce the complex compound when a simple process is carried out which neutralizes the raw salt of inorganic compound in a solution with the polyvinyl alcohol coexisting. The proton conductivity is given together with water resistance and strength to the polyvinyl alcohol by chemically bonding the polyvinyl alcohol to the inorganic compound. Flexibility is given to the inorganic compound by chemically bonding the polyvinyl alcohol to the inorganic compound. As a result, it is possible to manufacture the solid electrolyte having a high performance.

In addition, the above-mentioned complex compound is different from the conventional solid electrolyte of the perfluoro sulfonic acid type and has a high ion conductivity in an alkaline form. It is possible to apply to a primary battery, a secondary battery, an optical switch, or the like which is difficult to use the conventional solid electrolyte. Furthermore, by developing an alkaline form solid electrolytic film, it is easy to realize the secondary battery with a high energy density using a multivalent metal having an oxidation number which is not less than bivalent. For example, a nickel zinc cell is known in which a zinc oxide is used in the negative electrode and a nickel hydroxide, which is used also in a nickel hydride cell, is used in the positive electrode. The nickel hydroxide is used in a nickel hydride cell. In the nickel zinc cell, the zinc oxide is reduced into the zinc in the negative electrode at charge, as indicated by a formula (12). On the other hand, the zinc is electrochemically oxidized into the zinc oxide in the negative electrode at discharge, as indicated by a formula (13).

$$\text{(charge)} \ ZnO + H_2O + 2e^- \rightarrow Zn2OH^- \qquad (12)$$

$$\text{(discharge)} \ Zn + 2OH^- \rightarrow ZnO + H_2O + 2e^- \qquad (13)$$

Although the nickel zinc cell has a high stored energy inasmuch as the zinc has bivalent, there is a problem on which it is difficult to realize the nickel zinc cell because of dissolution of the zinc oxide and production of a needle shaped zinc, such as dendrite, which induces a short-circuit and a self-discharge. However, it is possible to resolve the problem by using the solid electrolyte. In addition, oxygen is restricted from diffusing to a zinc electrode in air zinc cell using an air electrode as a positive electrode. As a result, it is possible to easily obtain a chargeable air zinc cell. Furthermore, it is possible to realize the secondary cell using selected ones of the multivalent metals, by the solid electrolyte, inasmuch as there are copper, cobalt, iron, manganese, chromium, vanadium, tin, molybdenum, niobium, tungsten, silicon, boron, and aluminum as the multivalent metals except for zinc.

In other uses except for cell, the material, which is capable of being used as an electrode or a peripheral material, is not limited to an acid-proof material such as a noble metal, in case of using the alkaline form solid electrolyte. As a result, there is a merit in reducing a cost in an entire system.

(Patent Publication 1)
Japanese Unexamined Patent Publication Tokkai 2003-007133
(Patent Publication 2)
Japanese Unexamined Patent Publication Tokkai 2001-335314
(Patent Publication 3)
Japanese Unexamined Patent Publication Tokkai 2002-4151
(Patent Publication 4)
Japanese Unexamined Patent Publication Tokkai 2002-35832
(Patent Publication 5)
Japanese Unexamined Patent Publication Tokkai 2002-310093
(Non-patent Publication 1)
Electrochemistry, 69, No.3, 154-159(2001)
(Non-patent Publication 2)
Collected papers of national lecture in Institute of Electrical Engineers, P3373(2000)
(Non-patent Publication 3)

J.Electrochem.Soc., Vol. 143, No.10, 3348-3353 (1996)

Although there are many merits in applying to a wide range of uses inasmuch as the solid electrolyte produced by the polyvinyl alcohol and the inorganic compound is cheap and has a high efficiency, there is a problem in swelling greatly on the basis of water absorption in case of positioning the solid electrolyte in a wet condition, and reducing the strength of the solid electrolyte when the solid electrolyte swells. More particularly, the swelling is an important problem inasmuch as the solid electrolyte is positioned in the wet condition or the solid electrolyte is directly immersed in water, in case where the solid electrolyte is used in a fuel cell, an electrolysis device, or the like. Even in other uses except for the fuel cell or the electrolysis device, there is a problem in varying a size of the solid electrolyte with humidity. In addition, there is a problem in reducing an energy efficiency inasmuch as the methanol of fuel substantially permeates through the solid electrolyte composed of the complex compound, in use of the direct methanol type fuel cell, although the permeability is lower in comparison to the perfluoro sulfonic acid type electrolyte.

SUMMARY OF THE INVENTION

In order to dissolve the problems of the above-mentioned conventional high ion conductive solid electrolyte, it is an object of the present invention to provide a solid electrolyte of a low price and a high performance that includes a complex compound composed of polyvinyl alcohol, water, and at least one of inorganic compound selected from silicic acid compound, tungstic acid compound, molybdic acid compound, stannic acid compound, and zirconic acid compound and that exhibits low swelling and low strength reduction even if the solid electrolyte is positioned in the wet condition, and is capable of applying to devices such as a fuel cell and an electrolysis device, in which the solid electrolyte is used in a wet condition, and that exhibits a low size variation with humidity change and a low methanol permeability. It is another object of the present invention to provide an electrochemical system using the solid electrolyte.

In order to accomplish the above-mentioned objects, there is provided a solid electrolyte produced by replacing a part or all of hydroxyl groups of polyvinyl alcohol domain to groups each of which has a water absorption less than that of the hydroxyl group, in the solid electrolyte including a complex compound which is composed of polyvinyl alcohol, water, and at least one inorganic compound selected from silicic acid compound, tungstic acid compound, molybdic acid compound, stannic acid compound, and zirconic acid compound, according to the present invention.

On replacing the part or all of hydroxyl groups of polyvinyl alcohol domain to groups each of which has water absorption less than that of the hydroxyl group, a selected one of acetalizing reaction, etherifying reaction, and esterifying reaction is used. As a method of restricting the swelling, the solid electrolyte including the complex compound is reacted to aldehyde. For example, the reaction of the aldehyde and the solid electrolyte includes acetalizing reaction of polyvinyl alcohol domain in the complex compound. In addition, the reaction of the aldehyde and the solid electrolyte is carried out under a condition of the aldehyde and acid. The aldehyde is at least one selected from n-butyric aldehyde, isobutyric aldehyde, and benzoic aldehyde.

The complex compound included in the solid electrolyte has at least one selected from phosphorus, boron, aluminum, titanium, calcium, strontium, and barium compound. The complex compound included in the solid electrolyte is produced by neutralizing at least one alkali metal salt selected from silicic acid, tungstic acid, molybdic acid, and stannic acid, by acid in the aqueous solution with polyvinyl alcohol coexisting or by neutralizing zirconium chloride or zirconium oxychloride by alkali in the aqueous solution with polyvinyl alcohol coexisting, and by removing water as a solvent.

The complex compound included in the solid electrolyte has at least one selected from phosphorus, boron, aluminum, titanium, calcium, strontium, and barium compound. On addition of these compounds, a raw solution before neutralization includes at least one alkali metal salt selected from the boric acid and the phosphoric acid or at least one selected from the aluminum salt, the titanium salt, the calcium salt, the strontium salt, the barium salt, and the boric acid. The solid electrolyte including the complex compound is subjected to a heating treatment at a temperature which is not less than 100° C. The solid electrolyte including the complex compound is subjected to an immersing treatment under an acidic solution. Alternatively, the solid electrolyte including the complex compound is subjected to an immersing treatment under an alkali solution.

It is possible to use the solid electrolyte according to the present invention to any one of a fuel cell, a steam pump, a dehumidifier, an air conditioner, an electrochromic device, an electrolytic device, an electrolytic hydrogen producing device, an electrolytic hydrogen peroxide producing apparatus, an electrolyzed water producing apparatus, a humidity sensor, a hydrogen sensor, a primary battery, a secondary battery, an optical switch system, and a new battery system using a multivalent metal. In addition, it is possible to use the solid electrolyte according to the present invention to a fuel cell of direct methanol type.

PREFERRED EMBODIMENTS OF THE INVENTION

Figure 1:
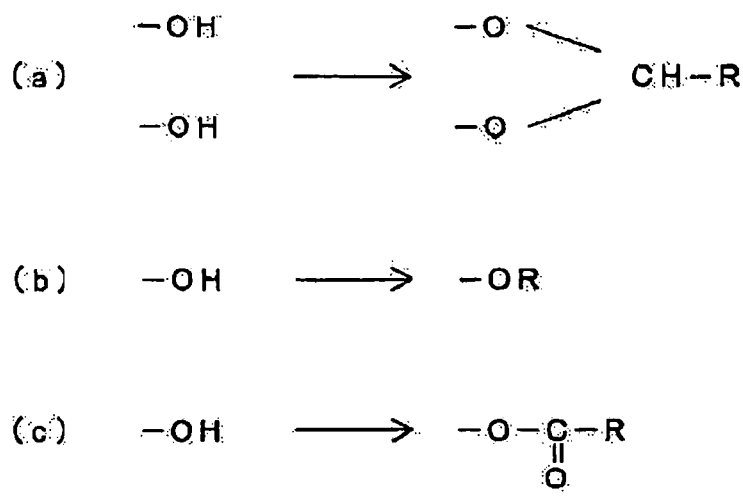
FIG. 1(a) shows a chemical formula of acetalizing reaction for hydroxyl group of polyvinyl alcohol domain.
FIG. 1(b) shows a chemical formula of etherifying reaction for hydroxyl group of polyvinyl alcohol domain.
FIG. 1(c) shows a chemical formula of esterifying reaction for hydroxyl group of polyvinyl alcohol domain.

Description will be made as regards a high ion conductive solid electrolyte according to an embodiment of the present invention and an electrochemical system using the high ion conductive solid electrolyte according to an embodiment of the present invention. In the present invention, the solid electrolyte includes a complex compound composed of polyvinyl alcohol, water, and at least one of inorganic compound selected from silicic acid compound, tungstic acid compound, molybdic acid compound, stannic acid compound, and zirconic acid compound. The solid electrolyte is obtained by replacing a part of hydroxyl groups or entire hydroxyl groups to groups each of which has water absorption lower than that of the hydroxyl group. The present invention also provides an electrochemical system using the solid electrolyte.

Description will proceed to an embodiment according to the present invention here in after. Incidentally, the present invention is not limited to the description of the embodiment.

Embodiment 1

On producing an electrolytic film, raw aqueous solution is obtained by adding mixture aqueous solution of 30 cc including 7.5 weight % sodium tungstate dihydrates ($Na_2WO_6 \cdot 2H_2O$) and 3 weight % trisoduim phosphate ($Na_3PO_4 \cdot 12H_2O$) and aqueous solution 10 cc of 3 weight % sodium silicate, to 10 weight % solution 100 cc of polyvinyl alcohol having average polymerization degree of 3100-3900 and saponification degree of 86-90%. Solution 20 cc of Hydrochloric acid of 1.2 M concentrations is dropped into the raw aqueous solution with agitation in order to obtain viscous precursor solution. The precursor solution is introduced into an airtight container, evacuated by a vacuum pump, in order to carry out defoaming.

A polyester film is positioned on a smooth plate of a coating device (manufactured by R K Print Coat Instruments Ltd. K control coater) having a blade which is capable of adjusting a gap between the plate and the blade, by using a micrometer. The defoamed precursor solution is cast on the polyester film in condition of heating the plate to a temperature of 55° C.-65° C.

Just after the precursor solution is cast on the plate, the precursor solution is swept by the blade whose gap is adjusted to 0.6 mm, at a predetermined speed, for the precursor solution is smoothed into a predetermined thickness. In this condition, water is vaporized from the precursor solution with heating the plate to the temperature of 55° C.-65° C. After fluidity of the precursor solution almost disappears, another precursor solution is cast on it again, and swept by the blade at the predetermined speed in order to smooth the precursor solution to the predetermined thickness. After the above-mentioned operation is repeated at three times, the plate is heated to a temperature of 105° C.-110° C. Under the temperature of 105° C.-110° C., a heating treatment is carried out for an hour. After an hour, the film produced on the plate is stripped off from the plate to be washed by water. The film is subjected to dry process.

The solid electrolyte film produced by the above-mentioned process is cut off into a plurality of samples each of which has a diameter of 30 mm. After each of samples is immersed in hydrochloric acid solution of 1.2M concentrations for an hour at a room temperature, each of samples is subjected to a reaction process of aldehyde without drying. Six sorts of reaction liquids are used in the above-mentioned treatment. ① Hydrochloric acid solution 50 ml of 1.2M concentrations with 1 ml of iso-butyric aldehyde is used as a first reaction liquid; ② A sulfuric acid solution of 0.6M concentrations with 1 ml of iso-butyric aldehyde is used as a second reaction liquid; ③ A solution, which has 8.5 weight % phosphoric acid solution 50 ml of 1.2M concentrations with 1 ml of iso-butyric aldehyde is used as a third reaction liquid; ④ A solution, which has hydrochloric acid solution 50 ml of 1.2M concentrations with 1 ml of n-butyric aldehyde, is used as a fourth reaction liquid; ⑤ A solution, which has hydrochloric acid solution 50 ml of 1.2M concentrations with 1 ml of benzoic aldehyde, is used as a fifth reaction liquid; and ⑥ A solution, which only has hydrochloric acid solution 50 ml of 1.2M of concentrations is used as a sixth reaction liquid.

Solid electrolytic samples obtained by the above-mentioned process are immersed in the first through the sixth reaction liquids, respectively. After an hour lapses at a room temperature with agitation of each reaction liquid, each of solid electrolytic samples is washed or cleaned and is subjected to a dry treatment.

After measuring a size of each solid electrolytic sample or film which is treated by aldehyde, in a dry condition, each solid electrolytic sample is immersed in water for an hour. After that, each solid electrolytic sample is again measured in size. In order to obtain a swelling degree of solid electrolytic samples, a variation ratio is calculated in accordance with average diameters before immersion and after immersion.

The measurement of ion conductivity is carried out with respect to each of the solid electrolytic samples on the basis of a following method. Each of solid electrolytic samples is sandwiched between two platinum circular plates each of which has a diameter of 28 mm. A brass circular plate is located on the outside surface of each platinum circular plate. Furthermore, they are clipped with an insulated clip. An alternating voltage of 10 mV is applied to a lead wire attached to the brass circular plates by using an LCR meter, with variation of frequencies of 5 MHz to 50 MHz. Responses are measured with respect to current and phase angle. The ion conductivity is calculated on the basis of a diameter of a semi-circle of Cole-Cole plots which is used in general. Incidentally, each of the solid electrolytic samples is positioned in a vessel of constant temperature and humidity which is controlled to the temperature of 50° C. and the relative humidity of 80%, on measurement. Description is made as regards the measurement results of the swelling degree and the ion conductivity as samples No. 1 to No. 6 in Table 1.

Table 1

TABLE 1

Swelling degree and ion conductivity of solid electrolytic film which mainly includes a complex compound composed of polyvinyl alcohol and an inorganic compound

| | main inorganic component | aldehyde treatment | | Swelling | ion conductivity |
|---|---|---|---|---|---|
| No. | of complex compound | a sort of aldehyde | acidic catalyst | degree (%) | (S/cm) |
| 1 | tungstic acid compound | None | hydrochloric acid | 21 | $8.8 \times 10^{-5}$ |
| 2 | tungstic acid compound | isobutyric aldehyde | hydrochloric acid | 1 | $2.6 \times 10^{-4}$ |
| 3 | tungstic acid compound | isobutyric aldehyde | sulfuric acid | 8 | $8.6 \times 10^{-5}$ |
| 4 | tungstic acid compound | isobutyric aldehyde | phosphoric acid | 10 | $6.9 \times 10^{-5}$ |
| 5 | tungstic acid compound | n-butyric aldehyde | hydrochloric acid | 14 | $5.7 \times 10^{-5}$ |
| 6 | tungstic acid compound | benzoic aldehyde | hydrochloric acid | 0 | $3.2 \times 10^{-5}$ |
| 7 | zirconic acid compound | None | hydrochloric acid | 25 | $8.9 \times 10^{-5}$ |
| 8 | zirconic acid compound | isobutyric aldehyde | hydrochloric acid | 11 | $8.8 \times 10^{-5}$ |

As understood from Table 1, the swelling degree is greatly decreases when the solid electrolytic sample is subjected to a reaction of aldehyde. More particularly, it is noted that a great swelling restrictive effect is obtained by a combination (sample No. 2 in Table 1) of iso-butyric aldehyde and hydrochloric acid catalyst or a combination (sample No. 6 in Table 1) of benzoic aldehyde and hydrochloric acid catalyst. When the solid electrolytic sample is reacted to aldehyde, the ion conductivity is not greatly decreases and the ion conductivity increases by using a combination (sample No. 2 in Table 1) of iso-butyric aldehyde and hydrochloric acid catalyst, in comparison to only using hydrochloric acid (sample No. 1 of Table 1). Incidentally, the solid electrolytic sample (sample No. 1) treated by only hydrochloric acid can be comparatively briefly broken by hand after the sample No. 1 is immersed in water. On the other hand, any one of the solid electrolytic samples treated by aldehyde cannot briefly broken by hand. Namely, it is possible to greatly improve the strength of the solid electrolytic sample in the wet condition when the solid electrolytic sample is treated by aldehyde.

Embodiment 2

On producing a solid electrolytic film, 6.5 weight % solution 50 cc of zirconium oxychloride octahydrates ($ZrCl_2O.8H_2O$) is added to 5 weight % solution 200 cc of polyvinyl alcohol having average polymerization degree of 3100-3900 and saponification degree of 86-90% in addition to polyacrylic acid of 1.1 g that has average molecular mass of 140000, in order to obtain a raw aqueous solution. Sodium hydroxide solution 45 cc of 1M concentrations and 1.2 weight % solution 75 cc of sodium silicate are dropped into the raw aqueous solution with agitation, in order to obtain viscous precursor solution. The precursor solution introduced into an airtight container which is evacuated by a vacuum pump, in order to carry out defoaming. A solid electrolytic film is obtained by using a manner similar to Embodiment 1.

The solid electrolytic film produced by the above-mentioned process are immersed in a reaction liquid having solution 50 ml of hydrochloric acid of 1.2M concentrations and iso-butyric aldehyde of 1 ml for an hour at a room temperature, with agitation of the reaction liquid. The solid electrolytic film is cut off into a solid electrolytic sample which has a diameter of 30 mm. After the solid electrolytic sample is immersed in sodium hydroxide solution of 0.5M concentrations for an hour, the solid electrolytic sample is subjected to a dry process and the surface of the electrolytic sample is wiped. Incidentally, the solid electrolytic sample, which is not immersed in the reaction liquid having aldehyde, is produced as a comparative example. In addition, the swelling degree and the ion conductivity are calculated in a manner similar to Embodiment 1.

Description is made as regards the measurement results of the swelling degree and the ion conductivity as samples No. 7 and No. 8 in Table 1. As understood from the measurement results of Table 1, the swelling degree is greatly decreases in the solid electrolytic sample of alkaline form when the solid electrolytic sample is subjected to the reaction of aldehyde. Furthermore, the solid electrolytic sample has a sufficient strength even though the solid electrolytic sample is immersed in water. In addition, it is noted that the ion conductivity does not decrease by the aldehyde reaction. Inasmuch as aldehyde mainly operates to a polyvinyl alcohol domain of the complex compound, it is possible to use the present invention to a solid electrolyte including the complex compound which is composed of polyvinyl alcohol, water, and at least one of inorganic compound selected from silicic acid compound, tungstic acid compound, molybdic acid compound, stannic acid compound, and zirconic acid compound except for Embodiments 1 and 2.

Embodiment 3

Figure 2:
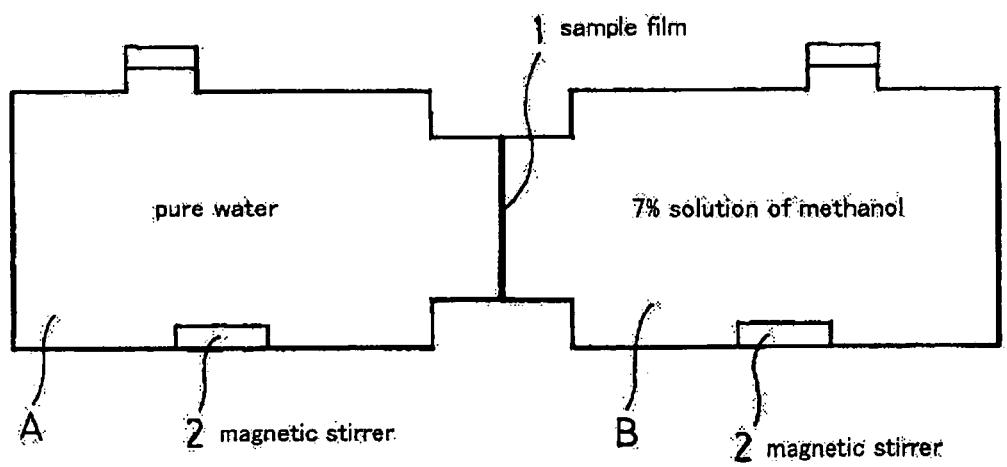
FIG. 2 shows a brief view of a device for measuring methanol permeability amount.

Methanol permeability is measured with respect to the samples No. 1 and No. 2 produced in Embodiment 1 and with respect to Nafion 117 which is an electrolytic film of perfluoro sulfonic acid type. More specifically, pure water is filled in a room A (80 ml) of a glass vessel that is separated from a room B by a solid electrolytic sample film 1, as shown in FIG. 2. 7% solution of methanol is filled in the room B (80 ml). The variation in the amount of methanol which leaks to the room A of pure water side is measured by using a gas chromatography. Incidentally, the liquid in the glass vessel is always stirred by a magnet stirrer 2 during the above-mentioned measurement and the measurement is carried out under the room temperature of about 23° C.-24° C.

Figure 3:
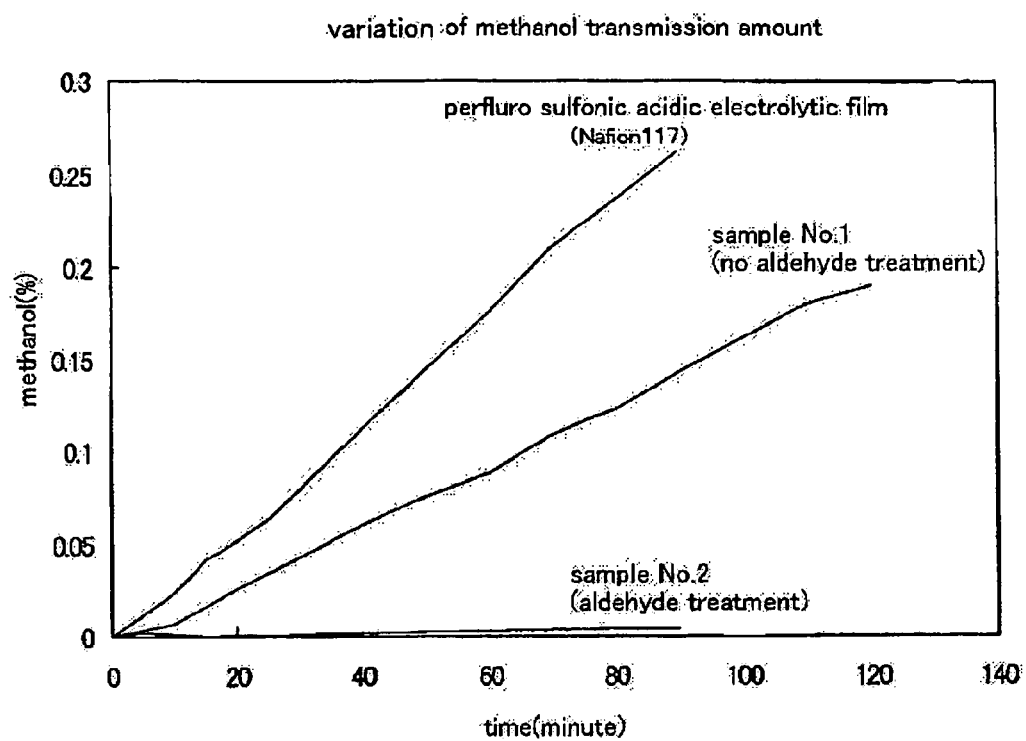
FIG. 3 is a graph for illustrating variation of methanol transmission amount.

FIG. 3 shows measurement results of the methanol permeability. The solid electrolytic film (sample No. 1) including the complex compound composed of polyvinyl alcohol and the inorganic compound has a methanol permeability which is less than that of electrolytic film of perfluoro sulfonic acid type, although the solid electrolytic film is not subjected to the aldehyde reaction. It is noted that the methanol permeability greatly decreases in the solid electrolytic film (sample No. 2) subjected to the aldehyde reaction. Therefore, it is possible to increase the energy conversion efficiency in the fuel cell of direct methanol type by using the solid electrolytic film which is subjected to the aldehyde reaction and which includes the complex compound composed of the polyvinyl alcohol and the inorganic compound.

In the complex compound which is composed of composed of polyvinyl alcohol, water, and the inorganic compound such as silicic acid compound, tungstic acid compound, molybdic acid compound, stannic acid compound, and zirconic acid compound, according to the present invention, the polyvinyl alcohol intertwines with the inorganic compound in micro-level. The polyvinyl alcohol is combined to the inorganic compound by hydrogen bond or hydrolytic condensation through hydroxyl group. However, the polyvinyl alcohol has a partial area which is not combined to the inorganic compound. The hydroxyl group of the partial area is combined to water in case of positioning the solid electrolytic film in the wet condition. As a result, the solid electrolytic film is expanded by water absorption. Therefore, it is possible to prevent the swelling of the solid electrolytic film in case of replacing the hydroxyl group to a group which has a water absorption less than that of the hydroxyl group, as will be described in the present invention.

As methods of replacing the hydroxyl group to the group which has the water absorption less than that of the hydroxyl, acetalizing reaction shown in FIG. 1(a) is used as a first method. Etherifying reaction shown in FIG. 1(b) is used as a second method. In addition, esterifying shown in FIG. 1(c) is used as a third method. More particularly, the hydroxyl group, which is not combined to the inorganic compound of polyvinyl alcohol domain, is preferentially acetalized, when the solid electrolytic film is reacted to aldehyde.

The hydrophilicity of the acetalized portion greatly decreases so that the solid electrolytic film is restricted from the swelling. In addition, alcohol absorption is restricted in the acetalized portion so that the methanol permeability is restricted, inasmuch as the hydrophilicity decreases in the hydroxyl group which is not combined to the inorganic compound. Furthermore, it is possible to obtain a desirable result when the solid electrolyte is acetalized under a condition at which aldehyde and acid exist, inasmuch as the acetalizing reaction is promoted under an acid catalyst.

In the aldehyde reaction, various sorts of reactions may be used if the reactions is sufficiently carried out. Each of aldehyde and acid may be in gaseous state or liquid state. Heating may be carried out during the aldehyde reaction. In addition, it is desired that the solid electrolyte in the swelling state is subjected to the aldehyde reaction, in order to carry out the aldehyde reaction in a condition of infiltrating aldehyde into the solid electrolyte, in the aldehyde reaction. It is further desired that the solid electrolyte is immersed in acid in order to expand the solid electrolyte and that the solid electrolyte is subjected to aldehyde reaction in a condition of infiltrating acid of catalyst into the solid electrolyte.

It is possible to use various sorts of aldehyde when the aldehyde is combined with the hydroxyl group of polyvinyl alcohol domain in the solid electrolyte including the complex compound and reduces the water absorption. For example, it is possible to use formic aldehyde, acetic aldehyde, propionaldehyde, n-butyric aldehyde, iso-butyric aldehyde, n-barrel aldehyde, methyl butyric aldehyde, benzoic aldehyde, or the like. Incidentally, one solid electrolyte may be reacted to more than two sorts of aldehyde. It is possible to use various sorts of acids each of which promotes the aldehyde reaction. For example, it is possible to use hydrochloric acid, sulfuric acid, phosphoric acid, or the like.

It is unnecessary to use a perfect object as the above-mentioned polyvinyl alcohol. It is possible to use a material which essentially functions as the polyvinyl alcohol. For example, the material in which a part of hydroxyl group is replaced by another group is able to function as the polyvinyl alcohol. In addition, the material made by the copolymerization of another polymer is able to function as the polyvinyl alcohol. Furthermore, it is possible to use polyvinyl acetate which is a raw material of the polyvinyl alcohol, as a starting material, inasmuch as the similar effect is obtained when producing the polyvinyl alcohol in the reaction process of the present invention.

Within a range in which the function of the polyvinyl alcohol according to the present invention significantly appears, it is possible to carry out mixture of any one of other polymers. The other polymers may be, for example, polyolefin polymer such as polyethylene or polypropylene, polyether polymer such as polyethylene oxide or polypropylene oxide, polyester polymer such as polyethylene terephthalate or polybutylene terephthalate, fluorinated polymer such as polytetrafluoro ethylene or polyfluoro vinyliden, polysaccharide such as methyl cellulose, polyvinyl acetate polymer, polystyrene polymer, polycarbonate polymer, and epoxy resin polymer. Furthermore, it is possible to carry out a mixture of other organic additives or inorganic additives. It is possible to obtain a high ion conductivity when the compound having carboxyl group such as polyacrylic acid or its metal salt is added to the solid electrolyte of alkaline form which mainly includes the complex compound composed of zirconic acid compound and polyvinyl alcohol, as described in Embodiment 2.

The precursor solution used in the present invention is produced by neutralizing at least one alkali metal salt selected from silicic acid, tungstic acid, molybdic acid, and stannic acid, by acid in the solution with polyvinyl alcohol coexisting or is produced by neutralizing zirconium chloride or zirconium oxychloride by alkali in the solution with polyvinyl alcohol coexisting. It is possible to use various kinds of metal salts if the alkali metal salt of silicic acid, tungstic acid, molybdic acid, or stannic acid can be dissolved in water. Furthermore, it is possible to freely choose a kind of alkali metal ion, a ratio of oxygen and positive ion. In addition, it is possible to freely choose a ratio of water. It is possible to use various kinds of zirconium salt or oxyzirconium salt if zirconium salt or oxyzirconium salt can be dissolved in water. Furthermore, it is possible to freely choose a ratio of oxygen and negative ion and a ratio of water. Incidentally, water is essentially used as a solvent in the solution according to the present invention. Other solvents may exist whose amount are less than the included water.

Although it is possible to include at least one selected from phosphorus, boron, aluminum, titanium, calcium, strontium, and barium compound, in the complex compound of the solid electrolyte in the present invention, at least one alkali metal salt selected from the boric acid and the phosphoric acid or at least one selected from the aluminum salt, the titanium salt, the calcium salt, the strontium salt, the barium salt, and the boric acid is added in the raw solution before neutralization. It is possible to use various kinds of the alkali metal salt of boric acid and the phosphoric acid if the alkali metal salt can be dissolved in water. Furthermore, it is possible to freely choose a kind of alkali metal ion, a ratio of oxygen and negative ion, and a ratio of water. It is possible to use various kinds of the aluminum salt, the titanium salt, the calcium salt, the strontium salt, or the barium salt if they can be dissolved in water. Furthermore, it is possible to freely choose a kind of negative ion, a ratio of oxygen and negative ion, and a ratio of water. In addition, it is possible to use a salt of heteropoly acid as a raw material. The heteropoly acid may be, for example, an acid selected from tungstophosphoric acid, molybdophosphoric acid, silicotungstic acid, silicomolybdic acid, tungstoboric acid, and molybdoboric acid which are obtained by previously compounding tungstic acid or molybdic acid to phosphoric acid, silicic acid, or boric acid.

It is possible to use any kind of alkali or acid by which neutralization is carried out with respect to the alkali metal salt of the silicic acid, the tungstic acid, the molybdic acid, or the stannic acid, or zirconium salt or oxyzirconium salt. It is possible to use hydrochloric acid, sulfuric acid, sodium hydroxide, lithium hydroxide, or the like.

In the solid electrolyte of the present invention, it is possible to increase the strength, water resistance and high temperature stability by promoting combination between the inorganic compound and the polyvinyl alcohol under heating treatment at a temperature which is not less than 100° C. In case where the heating treatment is not carried out, the problem occurs in which the strength reduces in high temperature water. The heating treatment may be carried out in an air atmosphere, an inert gas atmosphere, or a vacuum atmosphere.

In case of producing the proton conductive solid electrolyte of acid type, perfect protonation is carried out in the proton site of material by immersing the produced complex compound in acid. Since the proton concentrations increase, it is possible to increase the ion conductivity. It is possible to use various sorts of immersing acids if they can carry out protonation. It is possible to use hydrochloric acid, sulfuric acid, phosphoric acid, or the like. The acid immersion treatment is effective with respect to the electrolyte including tungstic acid compound. Incidentally, it is possible to obtain an effect similar to the acid immersion treatment in the aldehyde reaction, in case of coexisting with acid as a catalyst.

In case of obtaining the alkaline form proton conductive solid electrolyte or the hydroxide ion conductive solid electrolyte, the produced complex compound is subjected to the immersing treatment of alkali solution, in order to perfectly alkalize the produced complex compound. As a result, it is possible to increase the ion conductivity. It is possible to use any alkali immersing treatment which alkalizes the produced complex compound. For example, it is possible to use the solution of the sodium hydroxide, the potassium hydroxide, or the lithium hydroxide. Alternatively, it is possible to use the solution of alkali metal salt such as silicate, borate, or carbonate. More particularly, it is possible to obtain an advantage in which decrease in the ion conductivity eases up in a low relative humidity, in case of using the alkali salt such as silicate or carbonate. By using the alkali salt such as silicate or carbonate, it is advantageous that degradation eases up in performance of the solid electrolyte inasmuch as neutralization by carbon dioxide hardly occurs even if the electrolyte material is used in air or under an atmosphere having much carbon dioxide gas. The alkali immersing treatment is effective in case where the inorganic compound included in the electrolyte has silicic acid compound, molybdic acid compound, stannic acid compound, or zirconic acid compound. Incidentally, it is not necessary to use the aqueous solution on carrying out the acidic or alkali immersing treatment.

The high ion conductive solid electrolyte obtained according to the present invention presents the high proton or the hydroxide ion conductivity in alkaline form and it is possible to use a comparatively cheap material such as nickel, as the electrodes and other system configuration materials, by alkalizing the solid electrolyte. As a result, it is possible to reduce the cost of entire system.

Furthermore, it is possible to apply the solid electrolyte to the primary battery or the secondary battery when alkalizing the solid electrolyte. When the electrolytic material according to the present invention is used instead of the conventional electrolytic solution, it is possible to prevent leakage of solution. When using the alkaline form solid electrolyte, it is possible to realize the secondary battery having a difficulty of realization in the prior art, for example, a high energy density battery which uses a multivalent metal having bivalent or more, as a negative electrode.

Because the solid electrolyte according to the present invention is made of cheap materials and is made on the basis of simple aqueous solution process, the solid electrolyte according to the present invention is very cheap in comparison to a known perfluoro sulfonic acid electrolyte. It is unnecessary to use expensive noble metal in the electrodes and other members and it is possible to use the high ion conductive solid electrolyte in the primary battery and the secondary battery, according to the present invention.

Inasmuch as the solid electrolyte according to the present invention has the proton conductivity or the hydroxide ion conductivity, it is possible to use the solid electrolyte in each of the fuel cell, the steam pump, the dehumidifier, the air conditioner, the electrochromic device, the electrolytic device, the electrolytic hydrogen producing device, the electrolytic hydrogen peroxide producing apparatus, the electrolyzed water producing apparatus, the humidity sensor, and the hydrogen sensor in a manner similar to conventional perfluoro sulfonic acid ion exchange film. Inasmuch as the above-mentioned electrolyte also has the high ion conductivity in the alkaline form, it is possible to use the solid electrolyte in the electrochemical system such as the primary battery, the secondary battery, or the optical switch system. Furthermore, it is possible to the solid electrolyte in the new battery system using the multivalent metal.

As described above in detail, it is possible to provide a cheap ion conductive solid electrolyte and electrochemical system using the solid electrolyte according to the present invention, inasmuch as the solid electrolyte is produced by replacing a part or all of hydroxyl groups of polyvinyl alcohol domain to groups each of which has a water absorption less than that of the hydroxyl group, in the solid electrolyte including a complex compound which is composed of the polyvinyl alcohol, water and at least one inorganic compound selected from silicic acid compound, tungstic acid, molybdic acid compound, stannic acid compound, and zirconic acid compound.

More specifically, the conventional solid electrolyte composed of the polyvinyl alcohol and the inorganic compound greatly expands (swells) by water absorption in case of positioning the conventional solid electrolyte in a wet condition. Furthermore, the strength of the conventional solid electrolyte decreases in the wet condition. As a result, it is difficult to use the conventional solid electrolyte in the fuel cell or the electrolytic device in which the solid electrolyte is positioned in the wet condition. On the other hand, the solid electrolyte according to the present invention has a little swelling in the wet condition. Furthermore, the strength does not decrease in the solid electrolyte according to the present invention, in the wet condition. As a result, it is possible to use the solid electrolyte according to the present invention in a device such as a fuel cell or an electrolytic device used with the wet condition. Furthermore, it is possible to provide an electrochemical system using the solid electrolyte, inasmuch as the size variation is a little in the solid electrolyte even if humidity varies. In addition, the solid electrolyte according to the present invention has a low methanol permeability and it is possible to restrict the reduction of energy conversion efficiency in case of using the solid electrolyte in a direct methanol type fuel cell. It is possible to use the solid electrolyte according to the present invention in the electrochemical system such as the fuel cell, the steam pump, the dehumidifier, the air conditioner, the electrochromic device, the electrolytic device, the electrolytic hydrogen producing device, the electrolytic hydrogen peroxide producing apparatus, electrolyzed water producing apparatus, the humidity sensor, the hydrogen sensor, the primary battery, the secondary battery, the optical switch system, or the new battery system using the multivalent metal. It is possible to contribute to low price of the above-mentioned electrochemical system.

What is claimed is:

1. A solid electrolyte including a complex compound which is composed of polyvinyl alcohol, water, and at least one inorganic compound selected from silicic acid compound, tungstic acid compound, molybdic acid compound, stannic acid compound, and zirconic acid compound, characterized by a part or all hydroxyl groups of the polyvinyl alcohol domain are acetalized by a reaction of aldehyde with said solid electrolyte including complex compound, and are transformed into acetal having less water absorption than that of an hydroxyl group.

2. A solid electrolyte as claimed in claim 1, wherein the reaction of the aldehyde and the solid electrolyte is carried out under a condition of the aldehyde and acid.

3. A solid electrolyte as claimed in claim 1, wherein the aldehyde is at least one selected from n-butyric aldehyde, isobutyric aldehyde, and benzoic aldehyde.

4. A solid electrolyte as claimed in claim 1, wherein the complex compound included in the solid electrolyte has at least one selected from phosphorus, boron, aluminum, titanium, calcium, strontium, and barium compound.

5. A solid electrolyte as claimed in claim 1, wherein the complex compound included in the solid electrolyte is produced by neutralizing at least one alkali metal salt selected from salicylic acid, tungstic acid, molybdic acid, and stannic acid, by acid in the solution with polyvinyl alcohol coexisting or by neutralizing zirconium oxychloride by alkali in the solution with polyvinyl alcohol coexisting, and by removing water as a solvent.

6. A solid electrolyte as claimed in claim 5, wherein:
a raw solution before neutralization includes at least one alkali metal salt selected from the boric acid and the phosphoric acid or at least one selected from the aluminum salt, the titanium salt, the calcium salt, the strontium salt, the barium salt, and the boric acid; and the complex compound included in the solid electrolyte including at least one selected from phosphorus, boron, aluminum, titanium, calcium, strontium, and barium compound.

7. A solid electrolyte as claimed in claim 5, wherein the solid electrolyte including the complex compound is subjected to a heating treatment at a temperature which is not less than 100° C.

8. A solid electrolyte as claimed in claim 1, wherein the solid electrolyte including the complex compound is subjected to an immersing treatment under an acidic solution.

9. A solid electrolyte as claimed in claim 1, wherein the solid electrolyte including the complex compound is subjected to an immersing treatment under an alkali solution.

* * * * *